(12) United States Patent
Nakamichi

(10) Patent No.: US 11,454,788 B2
(45) Date of Patent: Sep. 27, 2022

(54) OPTICAL APPARATUS, CONTROL METHOD, AND STORAGE MEDIUM

(71) Applicant: CANON KABUSHIKI KAISHA, Tokyo (JP)

(72) Inventor: Takahito Nakamichi, Utsunmiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 328 days.

(21) Appl. No.: 16/536,455

(22) Filed: Aug. 9, 2019

(65) Prior Publication Data
US 2020/0073079 A1 Mar. 5, 2020

(30) Foreign Application Priority Data
Aug. 30, 2018 (JP) .............................. JP2018-162026

(51) Int. Cl.
| | | |
|---|---|---|
| G02B 15/14 | (2006.01) | |
| G02B 5/00 | (2006.01) | |
| G02B 7/00 | (2021.01) | |
| G03B 9/02 | (2021.01) | |
| G02B 7/10 | (2021.01) | |
| G02B 21/00 | (2006.01) | |
| G02B 7/09 | (2021.01) | |

(52) U.S. Cl.
CPC .............. G02B 15/14 (2013.01); G02B 5/005 (2013.01); G02B 7/006 (2013.01); G02B 7/102 (2013.01); G03B 9/02 (2013.01); G02B 7/09 (2013.01); G02B 21/00 (2013.01)

(58) Field of Classification Search
CPC .......... G03B 9/02; G03B 17/14; G03B 17/56; G03B 17/565; G03B 2206/00; G02B 5/005; G02B 7/09; G02B 7/006; G02B 7/102; G02B 21/00; G02B 15/14; H04N 5/225; H04N 5/232; H04N 5/23241
See application file for complete search history.

(56) References Cited

U.S. PATENT DOCUMENTS 11,002,940 B2 * 5/2021 Kakimoto .............. H04N 5/232
2017/0310867 A1 10/2017 Tsukamoto

FOREIGN PATENT DOCUMENTS

| JP | 2004205625 A | 7/2004 |
|---|---|---|
| JP | 2017003760 A | 1/2017 |
| JP | 2017090651 A | 5/2017 |
| JP | 2017090652 A | 5/2017 |
| JP | 2017194601 A | 10/2017 |

OTHER PUBLICATIONS

Office Action issued in Japanese Appln. No. 2018-162026 dated May 10, 2022. English translation provided.

* cited by examiner

*Primary Examiner* — Darryl J Collins
*Assistant Examiner* — Tamara Y. Washington
(74) *Attorney, Agent, or Firm* — Rossi, Kimms & McDowell LLP

(57) ABSTRACT

An optical apparatus configured to control driving of a diaphragm unit includes a setting unit configured to set a target position of an aperture blade in a diaphragm unit according to a zoom state, and a control unit configured to control a driving velocity of the diaphragm unit according to a residual driving amount by which a position of the aperture blade becomes the target position.

7 Claims, 4 Drawing Sheets

| ZOOM AREA<br>RESIDUAL DRIVING AMOUNT | FIRST ZOOM AREA | SECOND ZOOM AREA |
|---|---|---|
| 0 OR HIGHER AND BELOW 1 STEP | 10 pps | 5 pps |
| 1 STEP OR HIGHER AND BELOW 2 STEPS | 50 pps | 30 pps |
| 2 STEPS OR HIGHER | 100 pps | 50 pps |

OPTICAL APPARATUS, CONTROL METHOD, AND STORAGE MEDIUM

BACKGROUND OF THE INVENTION

Field of the Invention

The present invention relates to an optical apparatus such as an interchangeable lens apparatus and an imaging apparatus, each of which drives a diaphragm unit during zooming.

Description of the Related Art

In general, the F-number of the image-capturing optical system is determined by the aperture diameter of the diaphragm and the focal length (zoom state). Motion image capturing requires the diaphragm unit to be controlled so that the F-number is kept constant during zooming. Japanese Patent Laid-Open No. ("JP") 2017-194601 discloses an optical apparatus that reduces a driving velocity of a diaphragm unit when a motion image is captured than when a still image is captured in controlling the diaphragm unit according to the zoom state.

However, the optical apparatus disclosed in JP 2017-194601 degrades the tracking ability of the diaphragm unit to the change in the zoom state, as the zooming velocity becomes higher. In other words, it becomes difficult to keep the F-number constant.

On the other hand, simply increasing the driving velocity of the diaphragm unit causes the drive and stop of the diaphragm unit to repeat when the zoom velocity is slow, etc., the exposure does not smoothly change and thus flickers.

SUMMARY OF THE INVENTION

The present invention provides an optical apparatus that can improve an tracking ability of a diaphragm unit to a change of a zoom state and restrain an exposure from flickering.

An optical apparatus according to one aspect of the present invention is configured to control driving of a diaphragm unit and includes a setting unit configured to set a target position of an aperture blade in a diaphragm unit according to a zoom state, and a control unit configured to control a driving velocity of the diaphragm unit according to a residual driving amount by which a position of the aperture blade becomes the target position.

A control method of an optical apparatus according to another aspect of the present invention that controls driving of a diaphragm unit, the control method includes the steps of setting a target position of an aperture blade in a diaphragm unit according to a zoom state, and controlling a driving velocity of the diaphragm unit according to a residual driving amount by which a position of the aperture blade becomes the target position. A non-transitory computer-readable storage medium storing a program that causes a computer to execute the above control method also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

Figure 1:
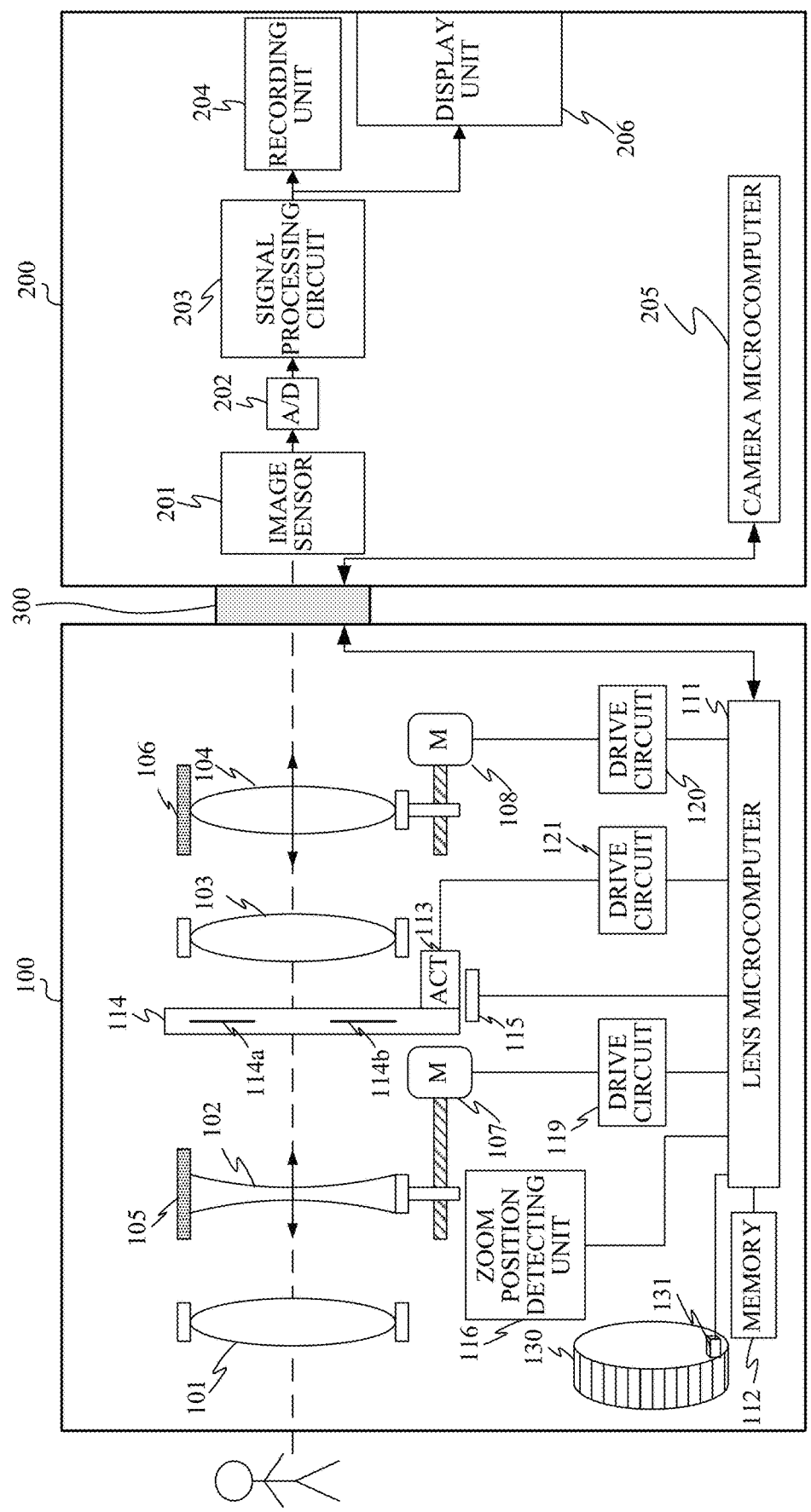
FIG. 1 is a block diagram showing a configuration of an interchangeable lens and a camera body according to one embodiment of the present invention.

FIG. 1 illustrates a configuration of a camera system including a lens unit (optical apparatus) 100 as an interchangeable lens apparatus according to an embodiment of the present invention, and a camera body (imaging apparatus) 200 to which the lens unit 100 is detachably and communicably attached.

The lens unit 100 has an image-capturing (or imaging) optical system. The image-capturing optical system includes, in order from an object side (left side in the figure), a field lens 101, a magnification-varying lens 102, an diaphragm unit 114, an afocal lens 103, and a focus lens 104. While each of the field lens 101, the magnification-varying lens 102, the afocal lens 103, and the focus lens 104 includes a single lens in the figure, it may include a plurality of lenses.

The magnification-varying lens 102 and the focus lens 104 move in the optical axis direction (arrow direction in the figure) for the magnification variation (zoom state change) and for focusing of the image-capturing optical system. The diaphragm unit 114 can change an aperture diameter by changing a position of diaphragm blades 114a and 114b in order to adjust a light amount passing through the image-capturing optical system. In this embodiment, the position of the diaphragm blades 114a and 114b or a F-number can be rephrased as an aperture position.

The magnification-varying lens 102 and the focus lens 104 are held by lens holding units 105 and 106, respectively. The lens holding units 105 and 106 are movably held in the optical axis direction by a guide shaft (not shown), and are driven in the optical direction in response to a driving force from stepping motors 107 and 108. In the diaphragm unit 114, diaphragm blades 114a and 114b are driven in the opening and closing directions by a driving force from a diaphragm actuator 113, whereby the diaphragm aperture diameter (or the aperture position) is changed. In the following description, driving of the diaphragm blades 114a and 114b will be referred to as driving of the diaphragm unit 114. A control over the driving of the diaphragm blades 114a and 114b may be a feedback control or an open control.

The lens unit 100 includes a lens microcomputer (referred to as a lens microcomputer hereinafter) 111 as a lens control unit. The lens microcomputer 111 controls driving of the focus lens 104 (stepping motor 108) and the magnification-varying lens 102 (stepping motor 107) according to a user operation of a focus operation ring 130 and a zoom switch (not shown) as an operation member provided to the lens unit 100.

During zooming, the optical arrangement of each lens in the image-capturing optical system changes. A zoom position detecting unit 116 is a detector that detects at least one position (referred to as a zoom position hereinafter) of the lenses constituting the magnification-varying lens 102 that moves during zooming. The zoom position detecting unit 116 includes a measurement unit using a variable resistance, a laser beam, or the like. The zoom position detected by the zoom position detecting unit 116 is input to the lens microcomputer 111. The zoom position may be detected by another method, for example, by detecting a change in the distance between two given lenses.

The stepping motors 107 and 108 are driven by a zoom drive circuit 119 and a focus drive circuit 120 which have received a zoom control signal and a focus control signal from the lens microcomputer 111, respectively. The lens microcomputer 111 controls the focus lens 104 (stepping motor 108) using electronic cam data stored in a memory 112 in order to correct the focus variation along with the magnification variation (zoom) caused as the magnification-varying lens 102 moves. The lens microcomputer 111 performs a control in accordance with various lens control commands transmitted from the camera body 200 (camera microcomputer 205 described later).

In the diaphragm unit 114, the aperture position as positions of the diaphragm blades 114a and 114b in the opening and closing directions is detected by the aperture position detecting unit 115, and the aperture position information is input to the lens microcomputer 111. The aperture position detecting unit 115 may be configured as a relative position sensor (incremental type encoder) using a photo-interrupter, a magnetic sensor, or the like, or an absolute position sensor (absolute type encoder). The lens microcomputer 111 outputs an aperture control signal to the diaphragm drive circuit 121 by referring to the detected aperture position. The diaphragm drive circuit 121 drives the diaphragm actuator 113 according to the diaphragm control signal. This embodiment uses a stepping motor for the diaphragm actuator 113, but may use another actuator such as a voice coil motor.

The focus operation ring 130 is the operation member for a manual focus (MF) operation, through which the user inputs an instruction to move the focus lens 104 to an arbitrary position. The rotation direction and the rotation amount of the focus operation ring 130 are detected by a rotation detecting unit 131. The rotation detecting unit 131 includes a photo-interrupter, and a slit light-shielding plate that rotates between a light-emitting portion and a light-receiving portion of the photo-interrupter along with the rotation of the focus operation ring 130. The photo-interrupter outputs a pulse signal because by a slit-shaped light-transmitting portion and a light-shielding portion of the slit light-shielding plate are alternately positioned between the light-emitting portion and the light-receiving portion. The pulse signal is input to the lens microcomputer 111. The lens microcomputer 111 detects a rotation amount of the focus operation ring 130 by counting pulse signals.

The rotation detecting unit 131 is configured by combining two photo-interrupters and one slit light-shielding plate which are mutually disposed at predetermined intervals. The lens microcomputer 111 can determine the rotation direction of the focus operation ring 130 by identifying a faster one of the output pulse waveforms from the two photo-interrupters.

The rotational velocity of the focus operation ring 130 can be detected (calculated) by measuring the time interval from an edge portion where the level of the output signal of one photo-interrupter switches to an edge portion of the output signal of the other photo-interrupter next time. If the two photo-interrupters are not arranged at designed intervals, the dimensional error appears as a time error between the edge portions, so the rotational velocity cannot be accurately detected. Since there is no such problem between the edge portions of the output signal of a single photo-interrupter, the lens microcomputer 111 according to this embodiment detects the rotational velocity of the focus operation ring 130 using the time interval at which these edge portions appear.

The lens microcomputer 111 controls driving of the focus lens 104 (stepping motor 108) in response to the MF operation information (rotation direction, rotation amount, and rotational velocity) detected by the rotation detecting unit 131 and the focus drive command transmitted from the camera microcomputer 205 described later via the focus drive circuit 120. The rotation detecting unit 131 includes a photo-interrupter in this embodiment, but may include a capacitance sensor, a magnetic sensor, or the like.

The lens microcomputer 111 controls driving of the diaphragm unit 114 (diaphragm actuator 113) via the diaphragm drive circuit 121 in accordance with the diaphragm drive command transmitted from the camera microcomputer 205.

The camera body 200 includes an image sensor 201 including a CCD sensor, a CMOS sensor, or the like, that captures (photoelectrically converts) an object image formed by the lens unit 100. The camera body 200 further includes an A/D conversion circuit 202, a signal processing circuit 203, a recording unit 204, a camera microcomputer 205 as a camera control unit, and a display unit 206.

The image sensor 201 photoelectrically converts an object image and outputs an electric signal (analog signal). The analog signal is converted into a digital signal by the A/D conversion circuit 202, and the digital signal is input to the signal processing circuit 203. The signal processing circuit 203 performs various signal processing for the input digital signal to generate a focus signal representing the focus state of the image-capturing optical system (object image) or generates a luminance signal representing the exposure state, and generate an image (or video) signal. The image signal generated by the signal processing circuit 203 is sent to the recording unit 204, and still image data and motion image data obtained by the image signal are recorded in the recording unit 204. A motion image corresponding to the image signal is displayed as a live-view image on the display unit 206. The user can confirm an imaging composition and a focus state by viewing the live-view image.

The camera body 200 and the lens unit 100 are mechanically and electrically connected by a mount 300 as a coupling mechanism. The lens unit 100 receives a power supply from the camera body 200 via a power terminal portion provided on the mount 300. The camera microcomputer 205 and the lens microcomputer 111 communicate with each other through a communication terminal portion provided on the mount 300.

The camera microcomputer 205 controls the camera body 200 in accordance with an input from an unillustrated imaging instruction switch, a camera setting switch, etc., provided in the camera body 200. The camera microcomputer 205 transmits a zoom drive instruction, a diaphragm drive instruction, and a focus drive instruction to the lens microcomputer 111.

Figure 2:
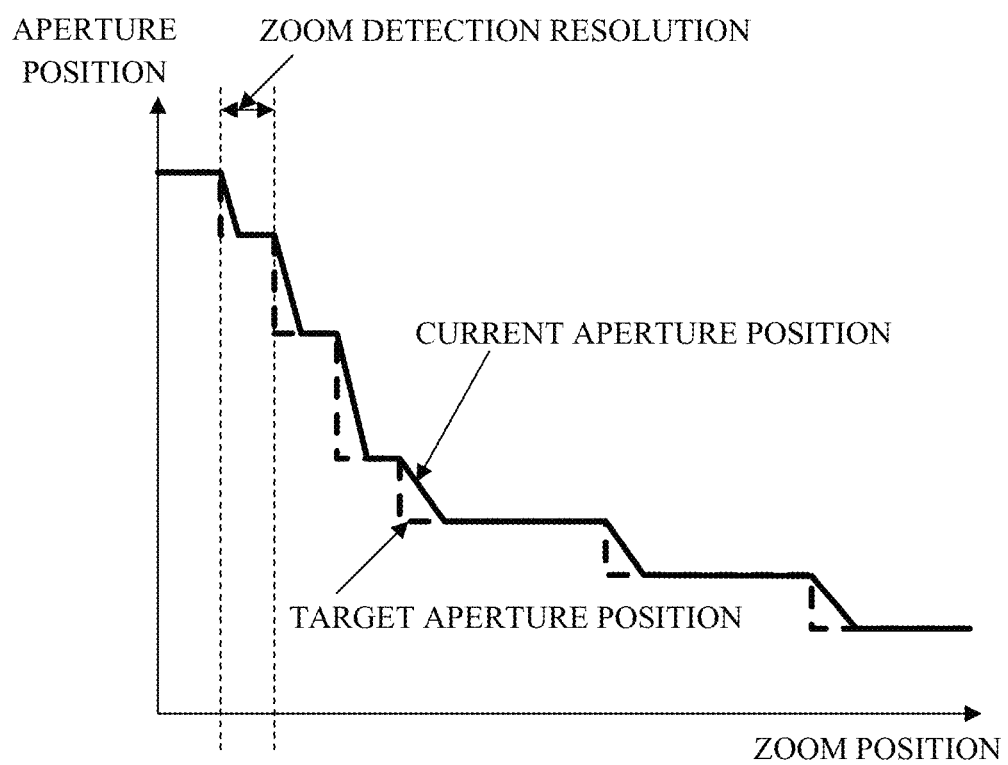
FIG. 2 illustrates a conventional diaphragm driving method during zooming.

The image-capturing optical system in the lens unit 100 according to this embodiment has an optical arrangement in which the F-number of the image-capturing optical system changes during zooming as the magnification-varying lens 102 moves while the positions of the diaphragm blades 114a and 114b are fixed. In order to maintain the F-number during zooming, as illustrated in FIG. 2, the positions (aperture positions) of the diaphragm blades 114a and 114b need to be moved to the target aperture positions properly set according to the position (zoom position) of the magnification-varying lens 102. FIG. 2 illustrates the aperture position change relative to the zoom position change. A broken line represents the change of the target aperture position (target position of the diaphragm blades 114a and 114b/target F-number), and a solid line represents the change of the current aperture position as the aperture position detected by the aperture position detecting unit 115.

The target aperture position is set for each zoom position that can be detected by the zoom position detecting unit 116 (or corresponding to the zoom detection resolution). On the other hand, when the aperture position detecting unit 115 is a relative position sensor, the current aperture position is detected by counting the number of output pulses of the aperture position detecting unit 115 from the reference aperture position. When the aperture position detecting unit 115 is an absolute position sensor, the aperture position detected by the aperture position detecting unit 115 becomes the current aperture position as it is.

When the diaphragm blades 114a and 114b are driven so that the aperture position reaches the target aperture position in the zoom position range narrower than the zoom detection resolution as shown by the solid line in FIG. 2, driving and stopping of the diaphragm blades 114a and 114b are repeated. As a result, the exposure repetitively change and does not change or flickers during zooming.

Figures 3, 4:
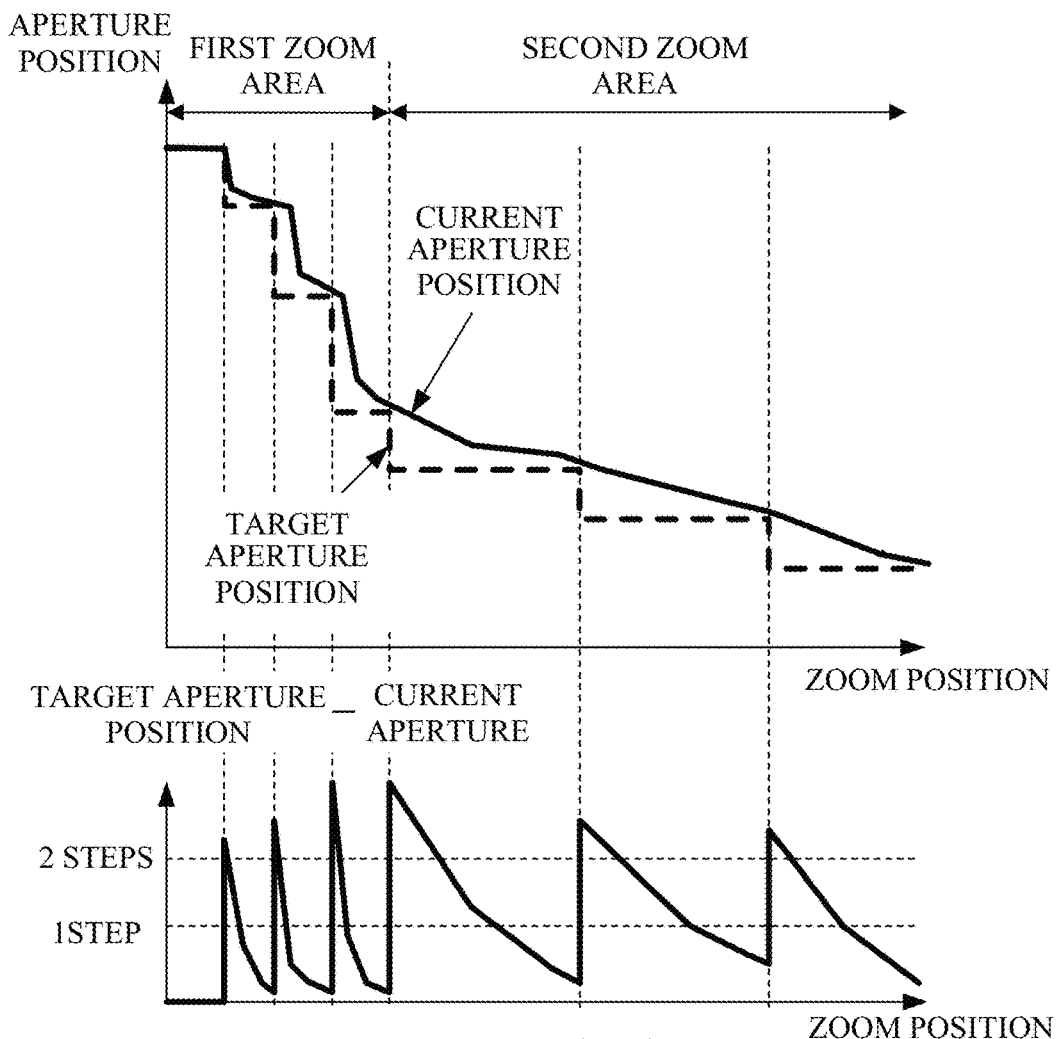
FIG. 3 illustrates a diaphragm driving method during zooming according to this embodiment.
FIG. 4 is a flowchart showing a diaphragm driving velocity calculation processing according to the embodiment.

Thus, as illustrated in FIG. 3, this embodiment suppresses the flicker of the exposure generated by driving the diaphragm blades 114a and 114b, and improves the tracking ability of the diaphragm aperture diameter to the zoom position in a high zoom velocity or the like.

An top view in FIG. 3 illustrates the aperture position change relative to the zoom position change, similar to FIG. 2. A broken line indicates a change in the target aperture position, and a solid line indicates a change in the current aperture position detected by the aperture position detecting unit 115. This embodiment divides a variable area of the zoom position into a first zoom area and a second zoom area. In the first zoom area, the change amount of the target aperture position per unit change amount of the zoom position (zoom state) is larger than that of the second zoom area. The change amount in the target aperture position per unit change amount in the zoom position (referred to as unit zoom amount hereinafter) is determined by the design and optical arrangement of the image-capturing optical system, and the area with a shorter focal length can have a larger change amount than the area with a long focal length or vice versa.

The bottom view in FIG. 3 illustrates a residual driving amount as a difference value between the target aperture position and the current aperture position for each zoom position. This embodiment sets the driving velocities of the diaphragm blades 114a and 114b (or the diaphragm unit 114) according to the zoom area where the zoom position is present and the residual driving amount. In the following description, the driving velocities of the diaphragm blades 114a and 114b will be referred to as a diaphragm driving velocity.

FIG. 4 illustrates an illustrative diaphragm driving velocity. In any of the first and second zoom areas, when the residual drive amount is large (such as 2 steps as a predetermined amount or larger), the aperture driving velocity is set to be high (such as 100 pps in the first zoom area and 50 pps in the second zoom area). When the residual drive amount is small (such as 1 step as the predetermined amount), the diaphragm driving velocity is set to be low (such as 10 pps in the first zoom area and 5 pps in the second zoom area). In other words, as the current aperture position approaches to the target aperture position, the diaphragm driving velocity is reduced, the zoom proceeds before the target diaphragm position, and then the next target diaphragm position is set. Thereby, the diaphragm blades 114a and 114b can continuously move without stopping, and the exposure is restrained from flickering. On the other hand, when the residual driving amount is large, for example, when the zoom velocity is high, the aperture driving velocity can be higher to improve the tracking ability of the current aperture position to the target aperture position.

The aperture driving velocity is set to be intermediate (such as 50 pps in the first zoom area and 30 pps in the second zoom area) between the large residual driving amount and the small residual driving amount. The predetermined amount and the aperture driving velocity described above are merely illustrative, and may be other values.

If the same aperture driving velocity as that of the first zoom area is set to the second zoom area where the change amount of the target aperture position per unit zoom amount (focal distance change amount) is smaller than that of the first zoom area, driving and stopping of the diaphragm blades 114a and 114b are repeated and the exposure flickers. Accordingly, the lens microcomputer 111 sets a different driving velocity even if the residual driving amount is the same between the first zoom area and the second zoom area. More specifically, a driving velocity having an absolute value smaller than that of the drive side in the first zoom area is set to the second zoom area even if the residual drive amount is the same.

The aperture driving velocity different according to the residual drive amount and the zoom area can restrain the exposure from flickering in the entire zoom area and improve the tracking ability to the target aperture position of the diaphragm unit 114.

The description in FIG. 4 is sorted according to two zoom areas and three types of residual drive amounts, but this sorting is merely illustrative. The embodiment may be sorted according to more zoom areas and more residual drive amounts.

Referring now to a flowchart in FIG. 5, a description will be given of setting processing of the aperture driving velocity. The lens microcomputer 111 serves as an aperture position setting unit and an aperture velocity control unit, reads a computer program stored in the memory 112 in the interchangeable lens 100, and executes this processing according to the program.

Initially, in the step 100, the lens microcomputer 111 detects the current position of the magnification-varying lens 102 (referred to as a current zoom position hereinafter) through the zoom position detecting unit 116. The processing of this step may be performed at predetermined time intervals or a predetermined time after the zoom position has changed last time.

Next, in the step 101, the lens microcomputer 111 determines whether or not the current zoom position has changed from the previously detected zoom position (referred to as a previous zoom position hereinafter). If the current zoom position has changed from the previous zoom position, the lens microcomputer 111 proceeds to the step 102 to set a new target aperture position. The target aperture position for each zoom position is previously stored in the memory 112. Thereafter, the lens microcomputer 111 proceeds to the step S103. On the other hand, if the current zoom position has not changed from the previous zoom position, the lens microcomputer 111 proceeds to the step 103.

In the step 103, the lens microcomputer 111 determines whether the current stop position has reached the target aperture position. If the current aperture position has reached it, this flow ends. On the other hand, if the current aperture position has not yet reached the target aperture position, the lens microcomputer 111 proceeds to the step 104 and determines whether the current zoom position is within the first zoom area or the second zoom area. If the current zoom position is within the first zoom area, the lens microcomputer 111 proceeds to the step S105, and if the current zoom position is within the second zoom area, the lens microcomputer 111 proceeds to the step S106.

In the step S105, the lens microcomputer 111 calculates the residual driving amount, and sets the aperture driving velocity based on the residual driving amount and the first zoom area. On the other hand, in the step S106, the lens microcomputer 111 calculates the residual driving amount, and sets the aperture driving velocity according to the residual driving amount and the second zoom area. Then, the memory 112 may store the data table of the aperture driving velocity corresponding to the residual driving amount and the zoom area as illustrated in FIG. 4, and the aperture driving velocity to be set may be read out of this data table. The aperture drive area may be set using a function having the residual driving amount for each zoom area as a variable.

The lens microcomputer 111 thus having set the diaphragm driving velocity controls the diaphragm actuator 113 so as to drive the diaphragm unit 114 (diaphragm blades 114a and 114b) at the aperture driving velocity in the step 107.

Figures 5, 6:
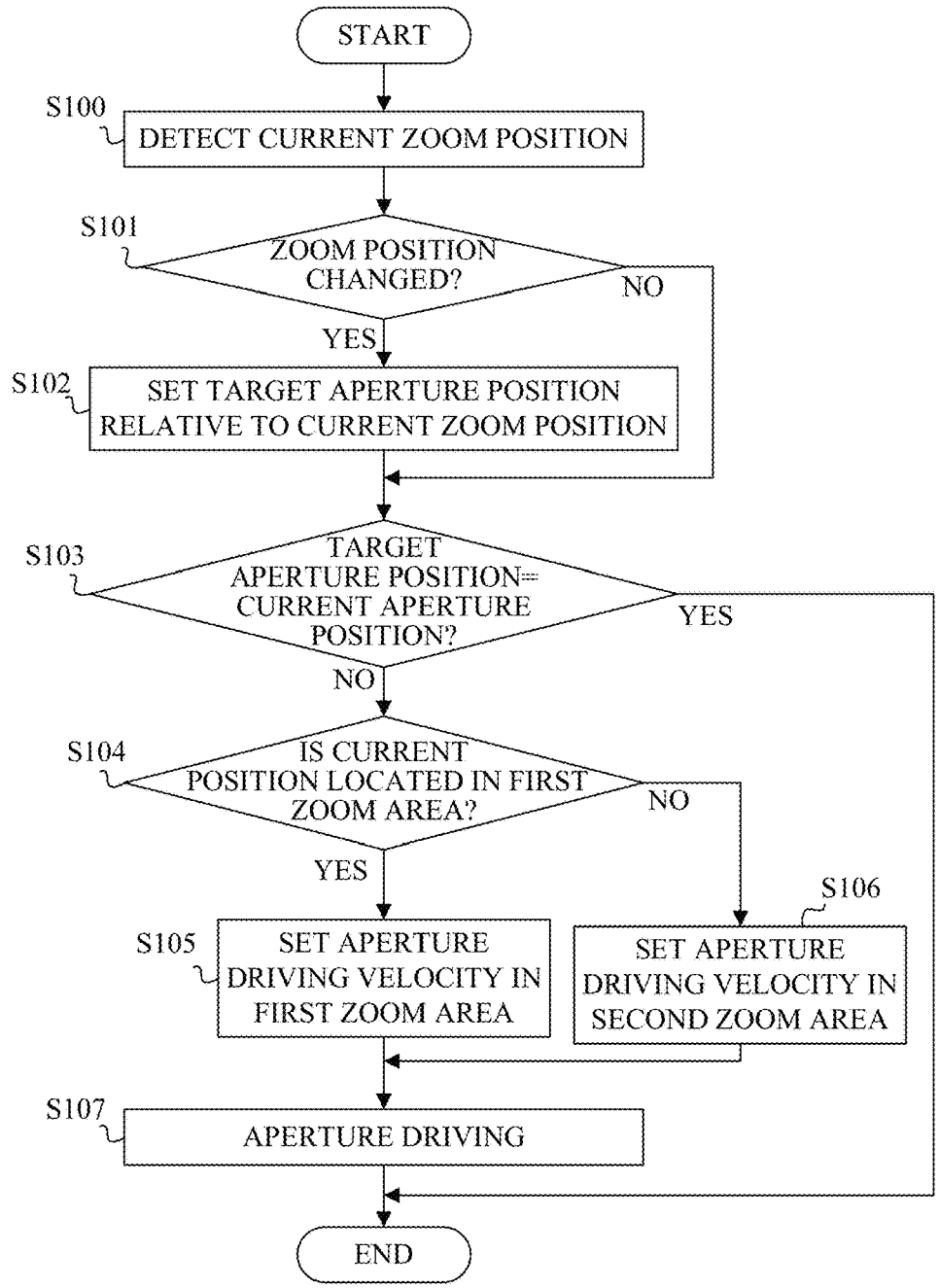
FIG. 5 illustrates a diaphragm driving velocity to a residual driving amount for each zoom area according to the embodiment.
FIG. 6 illustrates a correction coefficient used to calculate a diaphragm driving velocity for each zoom area according to a variation of this embodiment.

The camera microcomputer 205 in the camera body 200 as an optical apparatus performs the processing illustrated in FIG. 5 and transmits the diaphragm drive command including the set aperture driving velocity to the lens microcomputer 111 to drive the diaphragm unit 114.

While the above embodiment describes the aperture driving velocity set based on the data table or function of the aperture driving velocity, the aperture driving velocity may be set by another method. For example, as illustrated in FIG. 6, a data table of a correction coefficient may be prepared for each zoom area, and the aperture driving velocity may be set by multiplying the residual driving amount by each correction coefficient. Then, in the steps S105 and S106 in FIG. 5, the lens microcomputer 111 reads the correction coefficient according to the zoom range of the zoom position, and multiplies the residual driving amount by the correction coefficient to set the aperture driving velocity.

The above embodiment sets a higher aperture driving velocity as the residual driving amount is larger to the target aperture position of the diaphragm unit 114, and a lower aperture driving velocity as the residual driving amount is smaller. In other words, when the residual driving amount has a first value, the aperture driving velocity is set to a first velocity, and when the residual driving amount has a second value larger than the first value, the diaphragm driving velocity is set to a second velocity having a larger absolute value than that of the first velocity. Further, it is determined whether or not the residual driving amount is larger than a predetermined amount, and when it is larger than the predetermined value, the aperture driving velocity is set to be higher than that when it is smaller than the predetermined value. In other words, when the residual driving amount is larger than the predetermined value, the aperture driving velocity is set to the second velocity, and when the residual driving amount is smaller than the predetermined value, the aperture driving velocity is set to the first velocity.

Thereby, the aperture driving velocity is controlled so that the diaphragm unit 114 does not stop driving at the target aperture position while the zoom position is being changed. Thus, the above embodiment can suppress the flicker of the exposure caused by driving the diaphragm unit 114 during zooming, and improve the tracking ability to the target aperture position of the diaphragm unit 114.

The lens microcomputer 111 may set the aperture driving velocity based on the operation amount of the unillustrated zoom operation ring as well as setting the aperture driving velocity based on the detection result of the zoom position detecting unit 116.

The above embodiment can improve the tracking ability of the diaphragm unit to the change of the zoom state and suppress the flicker of the exposure, by controlling the driving velocity of the diaphragm unit in accordance with the residual driving amount of the diaphragm unit while the zoom state is being changed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-162026, filed on Aug. 30, 2018, which is hereby incorporated by reference herein in its entirety.

What is claimed is:

1. An optical apparatus configured to control driving of a diaphragm unit, the optical apparatus comprising:
   a processor configured to:
      set a target aperture position of aperture blades in the diaphragm unit according to a zoom state; and control a driving velocity of the diaphragm unit according to a residual driving amount by which an aperture position becomes the target aperture position,
wherein the processor changes, while the diaphragm unit is driving towards a first target aperture position corresponding to a first zoom state, the target aperture position to a second target aperture position corresponding to a second zoom state different from the first zoom state so that the diaphragm unit does not stop at the first target aperture position.

2. The optical apparatus according to claim 1, wherein the processor, in controlling the driving velocity of the diaphragm unit, is configured to set the driving velocity to:
a first velocity when the residual driving amount has a first value; and
a second velocity whose absolute value is larger than that of the first velocity when the residual driving amount has a second value larger than the first value.

3. The optical apparatus according to claim 2, wherein the processor:
is further configured to determine whether the residual driving amount is larger than a predetermined value;
in controlling the driving velocity of the diaphragm unit, is configured to set:
the driving velocity to the second velocity when the residual driving amount is larger than the predetermined value; and
the driving velocity to the first velocity when the residual driving amount is smaller than the predetermined value.

4. The optical apparatus according to claim 1, wherein the processor, in controlling the driving velocity of the diaphragm unit, is configured to make the driving velocity different according to a zoom area in the zoom state even if the residual driving amount has the same value.

5. The optical apparatus according to claim 1, wherein:
the zoom state is variable between a first zoom area and a second zoom area where a change amount of the target aperture position relative to a unit change amount of the zoom state is smaller than that of the first zoom area, and
the processor, in controlling the driving velocity of the diaphragm unit, is configured to make the driving velocity larger, in absolute value, when the zoom state in the first zoom area than that in the second zoom area even when the residual driving amount has the same value.

6. A control method for an optical apparatus that controls driving of a diaphragm unit, the control method comprising the steps of:
setting a target aperture position in the diaphragm unit according to a zoom state; and
controlling a driving velocity of the diaphragm unit according to a residual driving amount by which an aperture position becomes the target position,
wherein while the diaphragm unit is driving towards a first target aperture position corresponding to a first zoom state, the target aperture position is changed to a second target aperture position corresponding to a second zoom state different from the first zoom state so that the diaphragm unit does not stop at the first target aperture position.

7. A non-transitory computer-readable storage medium storing a computer program executable by a computer to execute a control method for an optical apparatus that controls an aperture position of a diaphragm unit zoom state, wherein the control method comprises the steps of:
setting a target aperture position in the diaphragm unit according to a zoom state; and
controlling a driving velocity of the diaphragm unit according to a residual driving amount by which an aperture position becomes the target position,
wherein while the diaphragm unit is driving towards a first target aperture position corresponding to a first zoom state, the target aperture position is changed to a second target aperture positon corresponding to a second zoom state different from the first zoom state so that the diaphragm unit does not stop at the first target aperture position.

\* \* \* \* \*